E. TOWE.
PERCOLATOR.
APPLICATION FILED FEB. 7, 1921.
1,374,166. Patented Apr. 5, 1921.
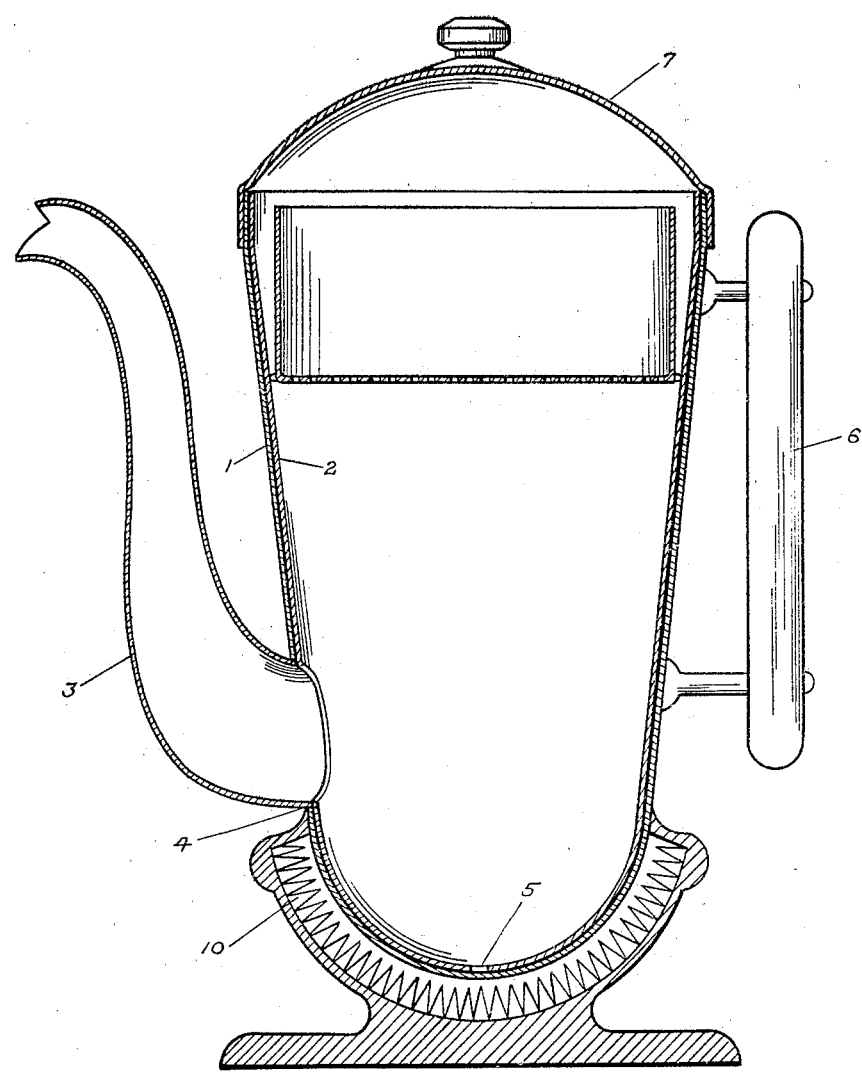
INVENTOR
Edward Towe
BY
Frank Keifer
ATTORNEY

UNITED STATES PATENT OFFICE.

EDWARD TOWE, OF ROCHESTER, NEW YORK, ASSIGNOR TO FREDERICK J. WEIDER, OF ROCHESTER, NEW YORK.

PERCOLATOR.

1,374,166.  Specification of Letters Patent.  Patented Apr. 5, 1921.

Application filed February 7, 1921. Serial No. 443,263.

*To all whom it may concern:*

Be it known that I, EDWARD TOWE, a citizen of the United States, residing at Rochester, in the county of Monroe and State of New York, have invented certain new and useful Improvements in Percolators, of which the following is a specification.

The object of this invention is to provide a new and improved form of percolator for percolating coffee.

This and other objects of this invention will be fully illustrated in the drawing, described in the specification and pointed out in the claims at the end thereof.
In the accompanying drawing:

The figure is a vertical sectional view of the percolator.

In the figure of the drawing like reference numerals indicate like parts.
In the percolators heretofore used the circulation of the water has been secured by the use of so called pumps that are placed in the center of the coffee pot and to which the heat had to be applied to the point of contact between the lower end of the pump and the lowest point in the coffee pot. The difficulty with this construction is that it takes considerable time to bring the point of contact between the pump and the coffee pot to the required temperature for the pump to operate. At the beginning the pump is surrounded with the cold water which tends to cool off the water contained in the pump until all of the water in the coffee pot has been raised to a fairly high temperature. After the water in the coffee pot has been raised it soon reaches the boiling point and it is a well known fact that coffee that is boiled loses a good portion of its flavor.
In the present invention the coffee pot is so constructed that the water contained therein is made to circulate almost instantaneously and the possibility of the boiling of the water is entirely eliminated. This is secured by the construction of the coffee pot shown in the drawing which consists of an inner shell 2 and an outer shell 1. The outer shell is provided with the customary spout 3 which terminates in the shell 1 at 4 near the bottom of the coffee pot. The inner shell 2 nests into the outer shell and is provided at its lowest point with a small hole 5 for a purpose that will presently appear. Opposite to the spout 3 the coffee pot is provided with a suitable handle 6 and the top of the coffee pot is closed with the cover 7.

It has been found in practice that the close fit between the outer and the inner shell of the coffee pot does not preclude a very small space between the two shells and when the inner shell 2 is filled with water, the water passes through the hole 5 in the bottom thereof into this very small space between the two shells and thus forms a thin film of water which surrounds the outside of shell 2. When heat is applied to the outer shell either electrically by means of the resistance coil 10 shown in the drawing or by any other heat producing means the thin film of water trapped between the outer and the inner shell is brought quickly to a higher temperature than that of the larger body of water contained in the inner shell 2. This in turn sets up a quick circulation of the water between the shells as the heated water is forced out between the shells at the upper ends thereof.

The small hole 5 in the center of the bottom of the inner shell 2 operates to throttle the amount of water passing therethrough into the space surrounding the shell. This is necessary in order to allow the heat agent to bring the water trapped between the shells to the desired temperature before it is replaced by the water passing through the hole from the inside of the inner shell. As the water is heated between the shells the inner shell is slightly lifted by the expansion of the water as it is heated and then drops back as the heated water is forced out through between the shells and is replaced by cold water from the inside of the inner shell passing through the hole 5. The up and down movement of the inner shell is of course very slight and hardly noticeable to the eye but the action takes place and it is this function of the inner shell that makes the percolating of the water in this coffee pot possible. The heated water forced out at the top between the shells is deflected by the inside of the cover 7, which forms a continuation to the inner wall of the coffee pot. The water thus deflected drops off from the middle of the cover and into a suitable coffee ground container 11.

This container is adapted to be supported on the inside of the inner shell 2 in any suitable manner in order to catch the water dripping from the cover of the coffee pot.

During the circulation of the water between the outer and the inner shell a film of water constantly separates these shells. The heat applied to the outer shell brings this water to the boiling point so that it quickly rises between the shells. The inner shell absorbs some of the heat of the boiling water surrounding it so that the heat transmitted to the inside of the inner shell is slightly lower in temperature than the water circulating between the inner and the outer shell. In this way a rapid circulation of the water is created between the two shells.

As shown in the drawing both the shells 1 and 2 are tapered toward the bottom and form portions of inverted cone shaped bodies. This construction makes possible the ready removal of the inner shell from the outer shell so that both the inner and outer shell can easily be cleaned on the inside as well as the outside. A sanitary construction of the coffee pot is thus secured. The fact that a small portion of the water is isolated from the main body of the water contained in the inside of the coffee pot which portion of the water is placed in such a way that it surrounds the main body of the water, and the fact that this isolated portion of the water is brought in contact with a large surface of the outer shell which is heated, secures an almost instantaneous circulation and prevents the boiling of the coffee after being percolated.

I claim:

1. In a percolator the combination of an outer and an inner shell one nesting within the other, said inner shell having an opening in the bottom thereof communicating with the space between said inner and said outer shell and means to apply heat to said outer shell.

2. In a percolator the combination of an inner and an outer shell, said inner shell having an opening in the bottom thereof communicating with the space between said inner and said outer shell, a spout in said outer shell said spout being in line with an opening in said inner shell, a cover over said outer shell to deflect the water issuing from between said outer and said inner shell.

3. In a percolator the combination of an inner and an outer shell, said inner shell having an opening in the bottom thereof communicating with the space between said inner and said outer shell, a spout in said outer shell said spout being in line with an opening in said inner shell, a cover over said outer shell to deflect the water issuing from between said outer and said inner shell, a container mounted in said inner shell through which the water forced out the top between said inner and said outer shell is adapted to flow.

4. In a percolator the combination of a pair of shells having inverted conical walls, said shells forming an inner and an outer shell, said inner shell having an opening leading into the space between the outer and the inner shell, means to apply heat to said outer shell.

5. In a percolator the combination of a pair of shells, one nesting within the other to form an outer and an inner shell, a passage way leading into the space between the inner and outer shell and a passage way leading out from between said inner and outer shell.

6. In a percolator the combination of a pair of shells having inverted conical walls, one nesting within the other with a minute space between them, said inner shell being provided with a passage way leading into the minute space between said shells near the bottom of said shell, an outlet from the space formed between said shells near the top thereof.

In testimony whereof I affix my signature.

EDWARD TOWE.